United States Patent [19]

Huang

[11] Patent Number: 4,970,894
[45] Date of Patent: Nov. 20, 1990

[54] DEVICE FOR MEASURING TIRE PRESSURE AND TIRE TREAD DEPTH

[76] Inventor: Tien-Tsai Huang, No. 4, Lane 30, Wu-Chang St., Pan-Chiao City, Taiwan

[21] Appl. No.: 427,297

[22] Filed: Oct. 26, 1989

[51] Int. Cl.⁵ .......................... B60C 23/02; G01L 7/16
[52] U.S. Cl. ...................................... 73/146.8; 73/744; 340/442
[58] Field of Search ...................... 73/146.8, 744, 146; 340/442

[56] References Cited

U.S. PATENT DOCUMENTS

| | | | |
|---|---|---|---|
| 4,526,030 | 7/1985 | Vecera, Jr. | 73/146.8 |
| 4,574,629 | 3/1986 | Weng | 73/146.8 |
| 4,916,944 | 4/1990 | Ho-Chuan | 73/146.8 |

Primary Examiner—Donald O. Woodiel
Attorney, Agent, or Firm—Seed and Berry

[57] ABSTRACT

A safety device includes a compacted body accommodating a pressure gauge for determining the internal pressure of a tire and a unit for determining the degree of wear caused to the tread of a tire, which includes a slide ruler to measure the depth of the indentations in the tread of the tire. The slide ruler is received in a slide groove provided in the body of the device and associated with graduation marks which show the depth of the indent in the tire tread when the slide ruler extends thereinto.

7 Claims, 3 Drawing Sheets 4,970,894

DEVICE FOR MEASURING TIRE PRESSURE AND TIRE TREAD DEPTH

BACKGROUND OF THE INVENTION

This invention relates to a safety device for a tire, and particularly to a pressure gauge incorporating a device for measuring the depth of the tread of a tire.

An object of the invention is to provide a safety device for a tire which can be used to measure the internal pressure as well as the degree of wearing caused to the tread thereof.

SUMMARY OF THE INVENTION

According to the present invention, a device for measuring the internal pressure and the tread depth of a tire comprises: a body having an elongated bore which accommodates a pressure sensing and measuring unit, and an adapter to connect the pressure sensing and measuring unit to an inflating valve of the tire, the body further having a first slide groove extending adjacent said bore, a slide piece received in the first slide groove, means for preventing the slide piece from escaping, and graduation marks provided on the slide piece, the slide piece having a bottom tapered end to extend out from the first slide groove to a patterned tread of the tire and a front face which is exposed from the first slide groove, the first slide groove having a bottom end to permit the bottom end of the slide piece to move outward, and a front open end to expose the front face of the slide piece.

The means for preventing the slide piece from release may include a tail portion projecting rearward from said slide piece, and a second slide groove provided in the body adjacent the rear face thereof for receiving the tail portion, the second groove having a bottom end terminating at a level higher than the bottom end of the first slide groove, the bottom end of the second slide groove preventing the tail portion from moving further downward when the tail portion reaches thereat, thereby limiting the downward movement of the slide piece.

The preventing means may further include a restricted front groove portion in the first slide groove adjacent the front open end, and a top stop member fitted in a top portion of the first slide groove.

The sensing and measuring unit includes a tube with a hollow plug member provided at one end thereof, the hollow plug having one end communicated with the adapter and another end communicated with the tube, a spring-loaded pressure responsive block interrupting the communication between the tube and the hollow plug, a pressure responsive piston provided in the tube, a graduated piston rod connected to the piston, and a pressure release means associated with the tube.

The present exemplary preferred embodiment will be described in detail with reference to the accompanying drawings, in which:

DETAILED DESCRIPTION OF THE DRAWINGS

DETAILED DESCRIPTION OF THE PREFERRED EMBODIMENT

Figure 1:
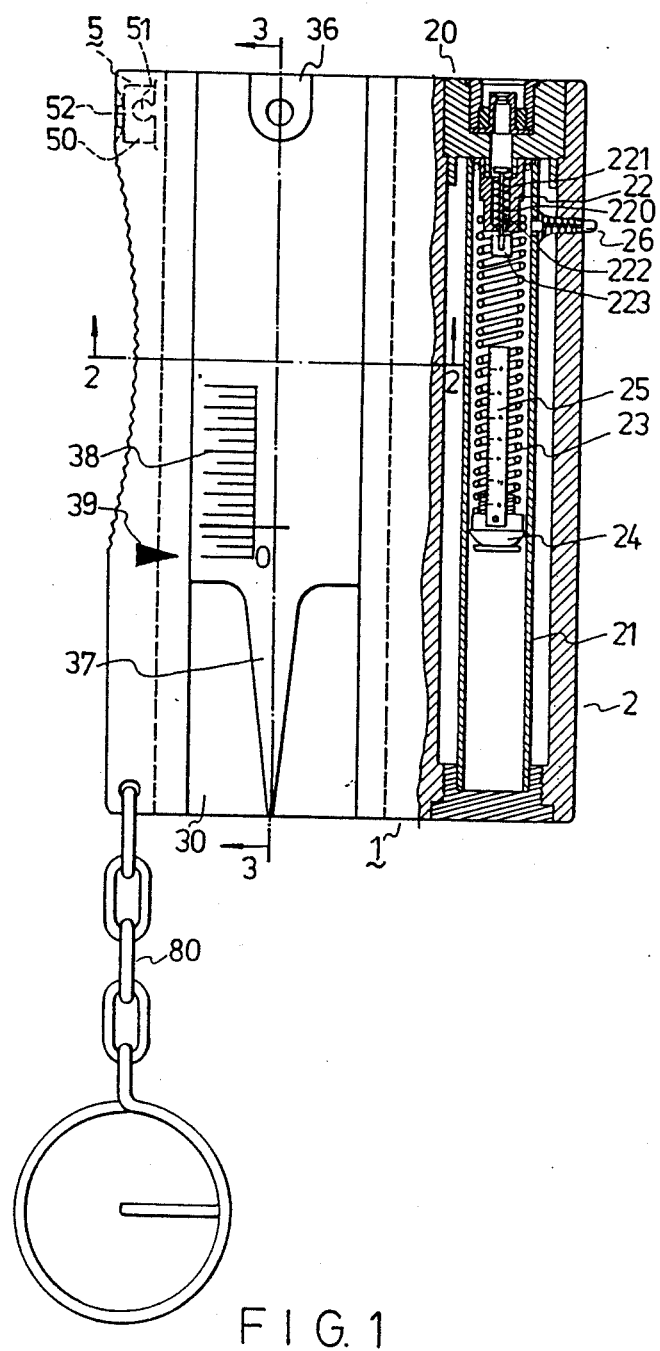
FIG. 1 is an elevated view of a device for measuring the pressure and the tread depth of a tire according to the present invention.

Referring to FIG. 1, a device for measuring the internal pressure and the tread depth of a tire is shown, having a flat body 1 with front and rear broad faces, two opposite side faces interconnecting the front and rear faces, a top face and a bottom face. The flat body is provided with an elongated bore 2 adjacent one of the side faces thereof. An adapter 20 is provided at one end of the bore 2 for the purpose of connecting the device to the inflating valve of a tire. The adapter 20 is known and thus is not detailed herein. An inner tube 21 is inserted into the bore 2. One end of the tube 21 is connected to the adapter 20 and the other end thereof is closed. A hollow plug 22 is provided within the inner tube 21 adjacent to the adapter 20. One end of the hollow plug 22 is communicated with the adapter 20 and the other end of the hollow plug 22 is communicated with the tube 21.

A movable rod 220 extends in the hollow plug 22 and a coil spring 221 is provided around the movable rod 220. A pressure responsive block 223 is connected to the movable rod 220 and provided outside the housing 22 to block the hole 222 by the force of the spring 221.

Another coil spring 23 is provided in the tube 21 around a piston rod 25 which is connected to a piston 24. One of the end of the coil spring 23 is attached to the hollow plug 22 and the other end thereof urges the piston 24. A pressure release means 26 is attached to the inner tube 21.

Figure 2:
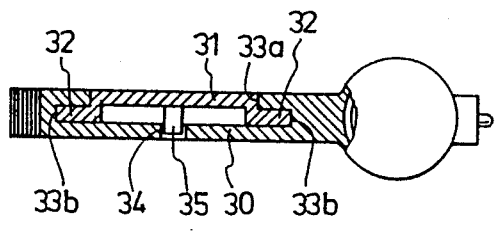
FIG. 2 is a sectional view taken along line 2—2 of FIG. 1.
Figure 3:
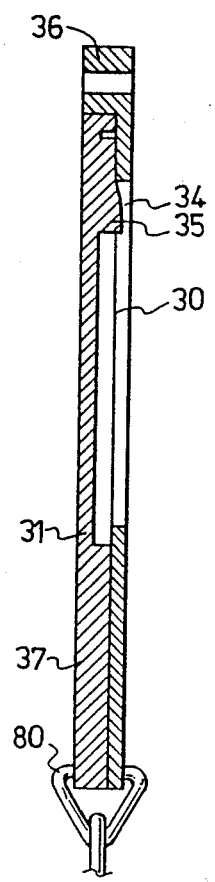
FIG. 3 is a sectional view taken along line 3—3 of FIG. 1.
Figure 4:
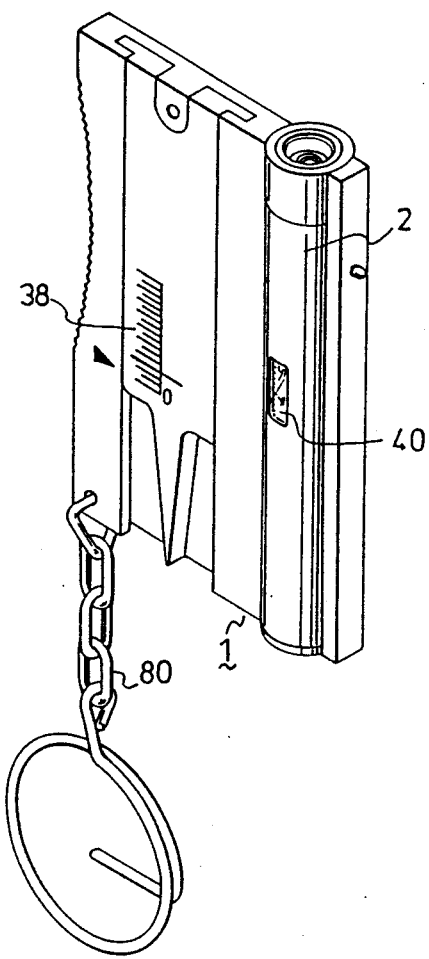
FIG. 4 is a perspective view of the device according to the present invention.

A main slide groove 30 is formed in the body 1 adjacent to the bore 2. The main slide groove 30 opens at a front face of the body 1 and extends in the longitudinal direction of the bore 2. As shown in FIGS. 2 and 3, the main slide groove 30 is provided with a restricted front groove portion 33a adjacent the front face of the body 1 and an enlarged groove portion 33b communicated with the restricted groove portion 33a. A slide piece 31 is provided in the slide groove 30 and has two opposite flanges 32 received in the enlarged groove portion 33b. The front face of the slide piece 31 is exposed from the restricted front groove portion 33a which prevents the slide piece 31 from escaping through the front side of the body 1.

The slide piece 31 is substantially rectangular at the top portion thereof and has a bottom tapered pin portion 37 which can extend into an indentation of a tread of a tire when the slide piece 31 is moved downward. At the rear side of the slide piece 31 is provided a projecting tail portion 35 which extends into a narrowed slide groove 34 provided at the rear side of the slide groove 30. The lower end of the narrowed slide groove 34 terminates at a level higher than the bottom open end of the slide groove 30. The tail portion 35 is prevented from moving downward upon reaching this lower end so that the slide piece 31 can never be released through the open end of the slide groove 30.

A stop member 36 is fitted to the top end of the slide groove 30 to prevent the slide piece 31 from escaping through the top end of the slide groove 30. Graduation marks 38 are provided on the exposed front face of the slide piece 31 and an indication mark 39 is provided on the front face of the body 1 adjacent to the graduation marks 38. When the top end of the slide piece 31 contacts the stop member 36, the indication mark 39 is aligned with "0" of the graduation marks which represents a depth of "0".

When the adapter 20 is attached to an inflating valve of a tire, the air in the tire enters the tube 21 through the hole 222 of the hollow plug 22 by pushing the pressure responsive block 223 away from the hole 222. The spring 221 is compressed when the block 223 is moved. The air flows into the tube 21 pushing the piston member 24, thereby moving the piston rod 25. After an appropriate period which allows the pressure in the tube 21 to reach an equilibrium condition, the device is detached from the tire. When the device is removed from the tire, the block 223 returns to the normal closing position thereof, thereby maintaining the equilibrium pressure in the tube 21 which can be read externally through an eye hole 40 from the graduation marks of the piston rod 25. After application, the pressure in the tube can be released through the pressure release means 26.

When it is desired to measure the degree of wear caused to a tire, the device of the invention can be put on the tread of the tire. The tapered pin 37 of the slide piece 31 measures the depth of the indentations of the tread when the pin 37 is moved thereinto. The measured result is shown by the alignment of one of the graduation marks 38 of the slide piece 31 with the indication mark 39.

The body 1 of the present invention is further provided with an alarm unit 5 adjacent to the slide piece 31. The alarm unit 5 is known and has an integrated circuit 50 including a sound producing element 51. The alarm unit 5 is controlled by a push button 52. The alarm unit 5 produces a warning sound at preset time intervals.

A key ring 80 is further attached to the body 1 so that the device of the present invention can be also used as a key holder.

With the invention thus explained, it is apparent that various modifications and variations can be made without departing from the scope of the invention. It is therefore intended that the invention be limited only as indicated in the appended claims.

What I claim is:

1. A device for measuring an internal pressure and a tread depth of a tire comprising:
    a body having an elongated bore which accommodates a pressure sensing and measuring unit, and an adapter to connect said pressure sensing and measuring unit to an inflating valve of the tire,
    said body further having a first slide groove extending adjacent said bore, a slide piece received in said first slide groove, means for preventing said slide piece from escaping, and graduation marks provided on said slide piece,
    said slide piece having a bottom tapered end to extend out from said first slide groove to a tread of the tire and a front face to be exposed from said first slide groove, said first slide groove having a bottom end to permit said bottom end of said slide piece to move outward, and a front open end to expose said front face of said slide piece.

2. A device as claimed in claim 1, wherein said body is a flat body which has a broad front face, a broad rear face, two opposite side face interconnecting said front and rear faces, a top face and a bottom face.

3. A device as claimed in claim 2, wherein said bore is provided adjacent one of said side faces, said preventing means including a tail portion extending rearward from said slide piece, and a second slide groove provided in said flat body adjacent said rear face for receiving said tail portion, said second groove having a bottom end terminating at a level higher than said bottom end of said first slide groove, said bottom end of said second slide groove preventing said tail portion from moving further downward when said tail portion reaches thereat, thereby limiting the downward movement of said slide piece.

4. A device as claimed in claim 3, wherein said preventing means further including a restricted front groove portion in said first slide groove adjacent said front open end, and a top stop member fitted in a top portion of said first slide groove.

5. A device as claimed in claim 4, wherein said pressure sensing and measuring unit includes a tube provided in said bore, a hollow plug member provided at one end of said tube, having one end communicated with said adapter and another end communicated with said tube, a spring-loaded pressure responsive block interrupting the communication between said tube and said hollow plug, a pressure responsive piston provided in said tube, a graduated piston rod connected to said piston, and a pressure release means associated with said tube.

6. A device as claimed in claim 1, further comprising a key ring attached to said body.

7. A device as claimed in claim 1, further comprising an alarm means incorporated into said body.

* * * * *